(12) United States Patent
Biswas et al.

(10) Patent No.: US 10,084,721 B2
(45) Date of Patent: Sep. 25, 2018

(54) TRANSFORMATION OF DISCRETE SERVICE EVENTS INTO CONTINUOUS, PERIODIC DATA FOR METERING AND BILLING OF CLOUD SERVICES

(71) Applicant: VMware, Inc., Palo Alto, CA (US)

(72) Inventors: Soumik Biswas, Bangalore (IN); Jonathan Cook, San Jose, CA (US); Vinay Eswara, Bangalore (IN); Jai Krishna, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 244 days.

(21) Appl. No.: 14/995,606

(22) Filed: Jan. 14, 2016

(65) Prior Publication Data

US 2016/0212064 A1 Jul. 21, 2016

Related U.S. Application Data

(60) Provisional application No. 62/104,327, filed on Jan. 16, 2015.

(51) Int. Cl.
| | |
|---|---|
| *H04L 12/911* | (2013.01) |
| *H04L 29/08* | (2006.01) |
| *G06F 9/50* | (2006.01) |
| *G06F 9/455* | (2018.01) |

(52) U.S. Cl.
CPC ........ *H04L 47/781* (2013.01); *G06F 9/45558* (2013.01); *G06F 9/5077* (2013.01); *H04L 67/10* (2013.01); *G06F 2009/45595* (2013.01)

(58) Field of Classification Search
CPC .................................................. H04L 47/781
USPC ........................................................ 709/226
See application file for complete search history.

(56) References Cited

U.S. PATENT DOCUMENTS

2010/0131624 A1* 5/2010 Ferris ................... G06F 9/5072
  709/221
2015/0363851 A1* 12/2015 Stella ................ G06Q 30/0631
  705/26.41

* cited by examiner

*Primary Examiner* — Vivek Srivastava
*Assistant Examiner* — Sibte Bukhari
(74) *Attorney, Agent, or Firm* — Patterson + Sheridan, LLP

(57) ABSTRACT

A cloud computing system includes services that provide virtual cloud computing resources. The service publishes service events that are transformed into periodic rating data as per centralized, pluggable, service-specific business rules. The cloud computing system includes a metering service that reduces network traffic for billing using a carry-forward mechanism that remembers a last-known rating state. Anomalies in the last-known state, such as, from lost or duplicate service events, can be detected via a reconciliation protocol between the metering service and cloud computing services.

12 Claims, 5 Drawing Sheets

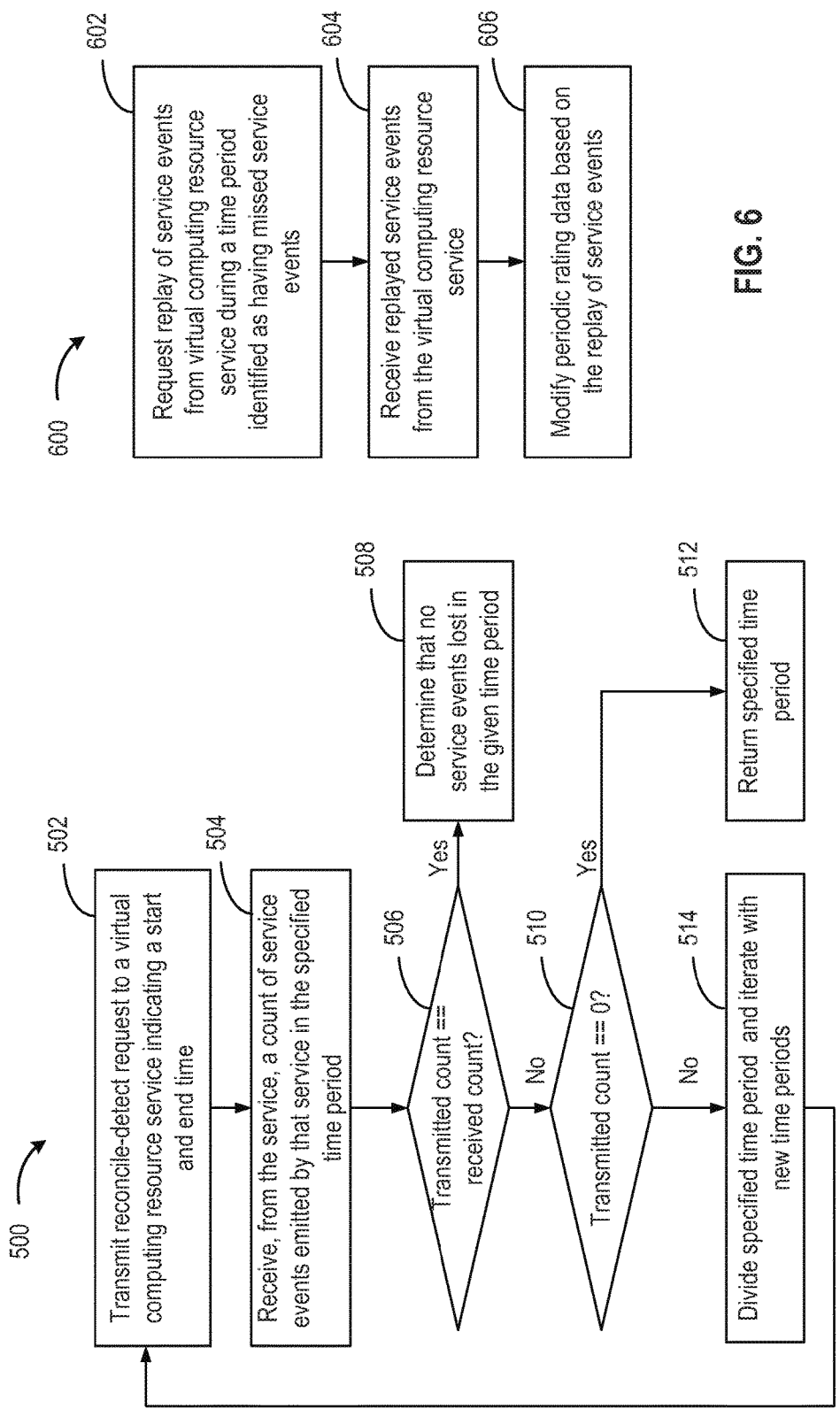

TRANSFORMATION OF DISCRETE SERVICE EVENTS INTO CONTINUOUS, PERIODIC DATA FOR METERING AND BILLING OF CLOUD SERVICES

CROSS-REFERENCE TO RELATED APPLICATION(S)

This application claims the benefit of U.S. Provisional Patent Application No. 62/104,327, filed Jan. 16, 2015, the entire contents of which are incorporated by reference herein.

BACKGROUND

Cloud architectures are used in cloud computing and cloud storage systems for offering infrastructure-as-a-service (IaaS) cloud services. Examples of cloud architectures include the VMware vCloud® Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. Such cloud services may be offered in a consumption-based billing arrangement, sometimes referred to as "pay-per-use" or "pay-as-you-go", which require metering and billing of used resources according to predefined business rules and plans. As such, there are challenges to implementing metering and billing capabilities that enable fine-grained tracking of usage and billed cost, preservation and retention of rated data at a sufficient granularity for historical lookup, and detection and correct resolution of billing errors and disputes.

SUMMARY

One or more embodiments provide a cloud computing system includes services that provide virtual cloud computing resources. The service publishes service events that are transformed into periodic rating data as per centralized, pluggable, service-specific business rules. The cloud computing system includes a metering service that reduces network traffic for billing using a carry-forward mechanism that remembers a last-known rating state. Anomalies in the last-known state, such as, from lost or duplicate service events, can be detected via a reconciliation protocol between the metering service and cloud computing services.

A method according to an embodiment includes the steps of: receiving, from a cloud computing service, a first service event indicating a change to an amount of virtual computing resources allocated to a user by the cloud computing service during a first time period; generating first periodic rating data for the first time period based on the received first service event; generating second periodic rating data for a second time period based on a last known state of the virtual computing resources according to the first service event, the second time period occurring after the first time period; responsive to determining at least one service event was not received during the first time period, requesting a replay of service events from cloud computing service during the first time period; and modifying the first and second periodic rating data based on the replay of service events.

BRIEF DESCRIPTION OF THE DRAWINGS

FIG. 5 is a flow diagram depicting a method for detecting missed service events in a cloud computing system, according to one embodiment of the present disclosure.

FIG. 6 is a flow diagram depicting a method for modifying usage data in a cloud computing system based on a reconciliation process, according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
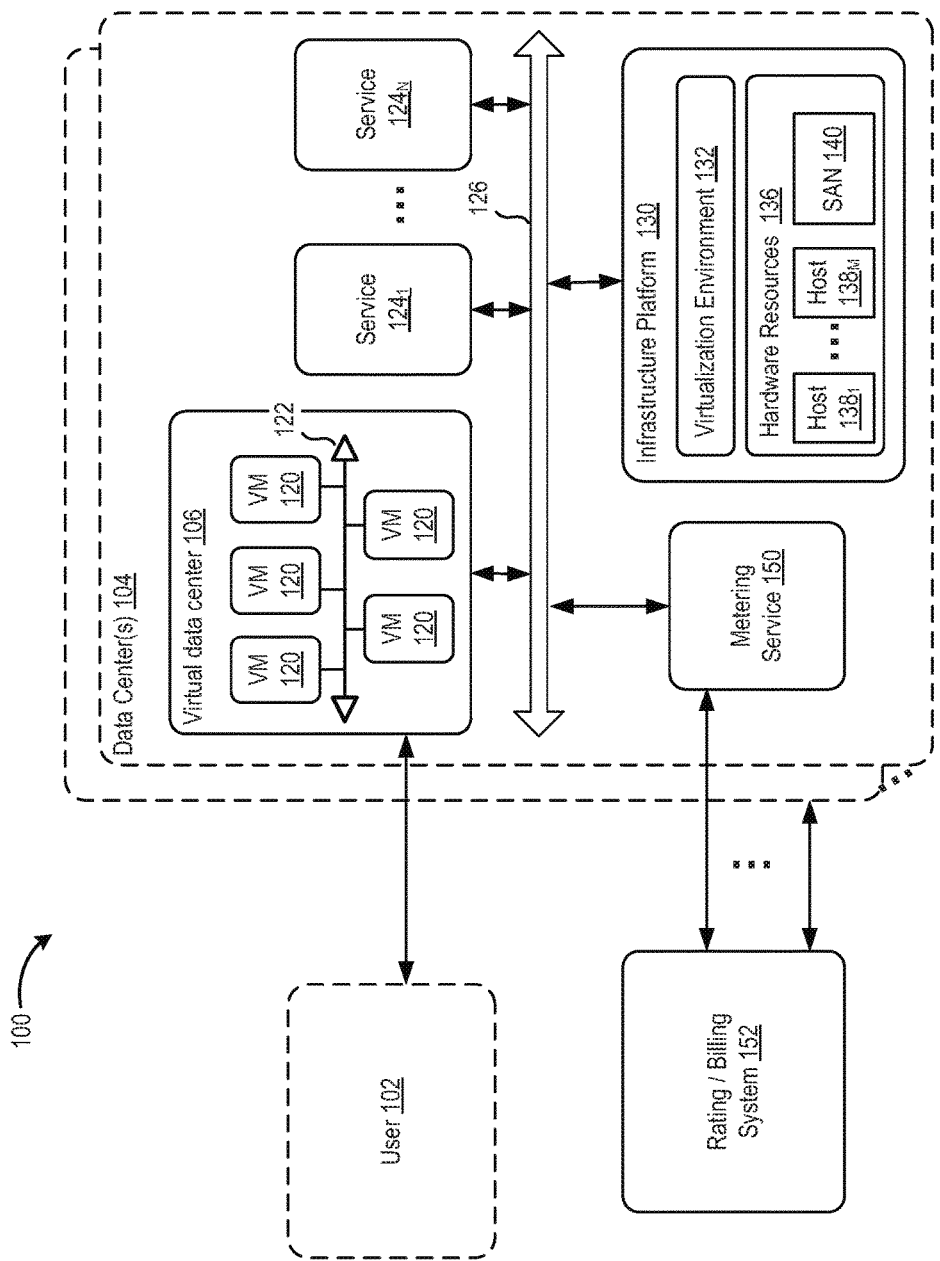
FIG. 1 is a block diagram that illustrates a computer system in which one or more embodiments may be utilized.

FIG. 1 is a block diagram of a cloud computing system 100 in which one or more embodiments of the present disclosure may be utilized. Cloud computing system 100 may be operated as a cloud computing service provider and exposed as a service available to account holders, such as a particular user (e.g., user 102) or enterprise. As such, cloud computing system may sometimes be referred to as a "public" cloud service. In one embodiment, cloud computing system 100 includes one or more data centers 104 configured to dynamically provide an enterprise (or users 102 of an enterprise) with one or more virtual data centers 106 in which a user may provision virtual machines (VMs) 120, deploy multi-tier applications on VMs 120, and/or execute workloads. A virtual data center 106 may be a logical construct that provides compute, network, and storage resources to an organization. Virtual data centers 106 provide an environment where VMs 120 can be created, stored, and operated, enabling complete abstraction between the consumption of infrastructure service and underlying resources.

Data center 104 includes an infrastructure platform 130 upon which a virtual data center 106 may be executed. In the particular embodiment of FIG. 1, infrastructure platform 130 includes hardware resources 136 having computing resources (e.g., hosts $138_1$ to $138_N$), storage resources (e.g., one or more storage array systems, such as SAN 140), and networking resources, which are configured in a manner to provide a virtualization environment 132 that supports the execution of a plurality of virtual machines 120 across hosts 138. In one embodiment, virtualization environment 132 may be implemented by running on hosts 138 VMware ESX®-based hypervisor technologies provided by VMware, Inc. of Palo Alto, Calif. (although it should be recognized that any other virtualization technologies, including Xen® and Microsoft Hyper-V® virtualization technologies may be utilized consistent with the teachings herein).

Hosts 138 may be constructed on a server grade hardware platform, such as an x86 architecture platform, a desktop, and a laptop. Each host 104 may include conventional components of a computing device, such as one or more processors (CPUs), system memory, a network interface, local storage, and other I/O devices such as, for example, a mouse and keyboard (not shown). Each host 138 is configured to provide a virtualization layer that abstracts processor, memory, storage, and networking resources of the hardware platform into multiple virtual machines $120_1$ to $120_N$ that run concurrently on the same hosts. VMs 120 run on top of a software interface layer, sometimes referred to herein as a hypervisor, that enables sharing of the hardware resources of host 138 by VMs 120. One example of a hypervisor that may be used in an embodiment described herein is a VMware ESXi hypervisor provided as part of the VMware vSphere solution made commercially available from VMware, Inc. The hypervisor may run on top of the operating system of host 138 or directly on hardware components of host 138.

In one embodiment, virtual data center 106 may be configured as a dedicated cloud service for a single tenant comprised of dedicated hardware resources 136 (i.e., physically isolated from hardware resources used by other users of data center 104). In other embodiments, virtual data center 106 may be configured as part of a multi-tenant cloud service with logically isolated virtual computing resources on a shared physical infrastructure. Cloud computing system 100 may support multiple virtual data centers 106, available to multiple enterprises in single-tenant and multi-tenant configurations.

Data center 104 includes one or more services $124_1$ to $124_N$ (collectively referred to as services 124) that provide virtual computing resources as well as information technology services to a virtual data center 106 in response to provisioning requests from a user. In one embodiment, a service 124 may be an orchestration component (e.g., implemented as a process running in a VM) that provides infrastructure resources to a virtual data center 106 responsive to provisioning requests. For example, if enterprise 102 required a specified number of virtual machines to deploy a web applications or to modify (e.g., scale) a currently running web application to support peak demands, the orchestration component can initiate and manage the instantiation of VMs 120 on hosts 138 to support such requests. In one embodiment, a service 124 may instantiate virtual machines according to a requested template that defines one or more virtual machines having specified virtual computing resources (e.g., compute, networking, storage resources), or modify an existing allocation of virtual computing resources to add or remove resources (e.g., add storage space, increase RAM). Other examples of services 124 include an object store service, database services, and Domain Name Services (DNS).

In one or more embodiments, services 124 are configured to coordinate with a metering service 150 to provide metering and billing functionality based on an amount of virtual computing resources allocated to and/or in use by a user at a given time. Services 124 and metering service 150 may communicate via a messaging bus 126, or other communications medium or network. Services 124 may be configured as "metered" services in which the services (e.g., virtual computing resources) allocated to or in use by a user are measured in quantifiable amounts. A meter can be considered as a logical device in a metered service that measures consumption, allocation, and/or use of a resource or service within data center 104. Examples of meters include CPU resources of a VM (e.g., measured both in GHz and/or number of CPU cores), RAM resources of a VM (e.g., measured in GB), disk-based storage resources of a VM (e.g., measured in GB), solid-state storage sources of a VM, and ingress/egress bandwidth for network resources (e.g., measured in Kb). Meters can be classified as edge-triggered meters or sampled meters, based on how the measurements are made and how the values are processed by metering service 150.

Edge-triggered meters may be used when measuring quantities that are allocated and generally not volatile. Edge triggered meters typically change in value when the measured quantity changes due to a change in allocation (e.g., allocated CPU size for a VM). In some cases, such meters need only be transmitted, or "emitted", by a metered service 124 only when the value changes. In one embodiment, metering service 150 is configured to provide a "carry-forward" functionality by which the value emitted at a particular point in time is carried over into the future. For example, the CPU size of a VM may be emitted at the instant a VM is powered on, and if the CPU size has been declared as an edge-triggered meter, metering service 150 may automatically carry the emitted value forward in time until metering service 150 sees another service event that corresponds to the VM being powered off (at which time, the CPU-size meter returns to zero.) Sampled meters take periodic samples of a measured quantity. Sampling fits some meters more naturally and typically measure accumulative quantities. For example, the number of ingress/egress bytes on a network can be measured, say, every minute.

Each service 124 may include an "emitter" logical component configured to observe all meters managed by the respective service and publish service events, which are messages containing the meter state, when appropriate. Each service may be configured to maintain an audit trail of emitted service events in order to support forensics in the event of billing disputes.

In one or more embodiments, metering service 150 (e.g., executing as a VM) is configured to provide for the observation and recording of measurable quantities in a metered service 124. Metering service 150 is configured to accept emitted service events indicating meters from a metered service 124, normalize the service events to a periodic value (e.g., hourly value) for each meter, map the periodic value to a billable aspect, and generate a bill representing the consumed computing resources. In one embodiment, cloud computing system 100 further includes a rating and billing system 152 configured to report billable aspects representing contracts and business rules between a metered service and user(s) 102 to enable metering service 150 to measure and determine costs of the consumed computing resources. Each service 124 may have a different business rule maintained by rating and billing system 152, reflecting a separate itemized and quantifiable cost to the consumption of a virtualized computing resource.

While a single data center 104 is depicted in FIG. 1, it is recognized that cloud computing system 100 may include multiple data center 104 located in different geographical locations (e.g., different cities, countries, continents). In one embodiment, each data center 104 may include a separate instance of metering service 150, which provides an instance of metering service 150 is geographical proximity to metered service 124 and service events emitted by those metered services 124. The plurality of instances of metering service 150 may coordinate with a single instance of rating and billing system 152, which centralizes and manages business rules and rating and billing activity for cloud computing system 100. As such, high-frequency service events reported by metered services 124 may be aggregated within a particular locality by the respective instance of metering service 150, which effectively reduces the amount of traffic between data centers of cloud computing system 100, including meter traffic, and reduces the latency in generating billing reports.

Figure 2:
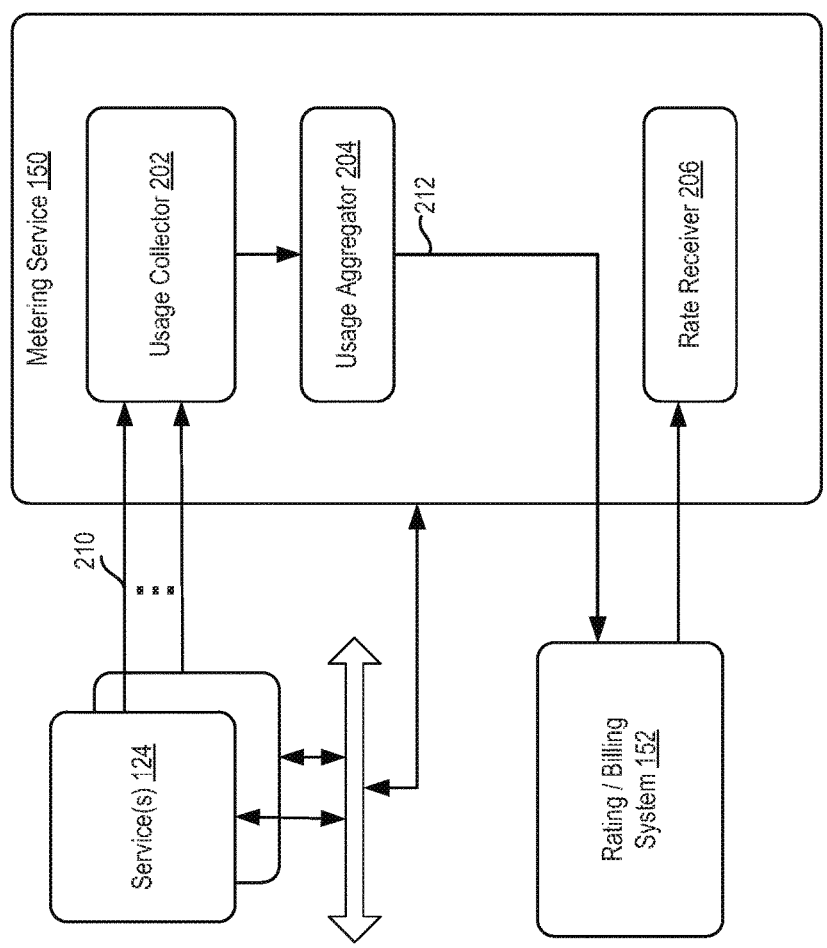
FIG. 2 is a block diagram depicting a metering service for a cloud computing system, according to one embodiment of the present disclosure.

FIG. 2 is a block diagram depicting a metering service 150 for a cloud computing system, according to one embodiment of the present disclosure. As shown, metering service 150 may include a usage collector 202, a usage aggregator 204, a billable usage publisher 206, and a rate receiver 208. It is recognized that each of the functionality components within metering service 150 may be running as processes, batch jobs, services, and other forms of software modules, executing within a VM or hardware device.

In one embodiment, usage collector 202 is configured to receive and persist all emitted service events 210 within a data center 104. As mentioned above, each metered service 124 transmits service events 210 indicating when resources have been allocated or de-allocated by the user. Some service events 210 may be formatted as a special terminal, end-of-life event to indicate to metering service 150 that no more events would be received for that resource, for example, on termination of a VM. An example format for a service event 210 is provided below, although other formats may be used:

```
svc: { instid: org1, type: Compute, release: 1.0.0 },
eventtype: allocation,
occurrence-timestamp: 00:15:01,
meters: [
    {name: compute.vm.cpu, value: 1},
    {name: compute.vm.ram, value: 2},
    {name: compute.vm.storage.tier1, value:200},
    {name: compute.vm.storage.tier2, value: 1000}]
```

As shown in the example service event above, each service event 210 may include an identifier (e.g., "org1") specifying the user or organization consuming the virtual computing resources. Each service event 210 may contain all meters for the allocated virtual computing resource. In the example shown, meters for the CPU, the RAM, and different tiers of storage are all specified in the example service event. Each service event 210 may specify a timestamp indicating a time of occurrence of the allocation event.

Metering service 150 is configured to start metering the usage of virtual computing resources based on received service events 210. For example, in response to the above example service event, metering service 150 may begin metering for CPU resources at 1 unit per hour, for memory resources at 2 units per hour, for storage resources at 200 units per hour and 1000 units per hour, respectively.

Metering service 150 may be configured to modify the metering of virtual computing resources in response to subsequently received service events. For example, at a later time, metering service 150 might receive a second service event indicating that the user has doubled the CPU and the RAM for the allocated VM, as indicated by the updated values "2" and "4" respectively, as shown in the below second example service event. From this point onward, metering service 150 records usage of CPU resource at rate of 2 units per hour, and RAM resources at a rate of 4 units per hour (and storage resource usage rate is unchanged).

```
svc: { instid: org1, type: Compute, release: 1.0.0 },
eventtype: allocation,
occurrence-timestamp: 02:15:01,
meters: [
    {name: compute.vm.cpu, value: 2},
    {name: compute.vm.ram, value: 4},
    {name: compute.vm.storage.tier1, value:200},
    {name: compute.vm.storage.tier2, value: 1000}]
```

In another example, say after 8 hours later, the user powers down a VM, which may cause a service 124 to transmit the following service event to metering service 150.

```
svc: { instid: org1, type: Compute, release: 1.0.0 },
eventtype: allocation,
occurrence-timestamp: 10:15:01,
meters: [
    {name: compute.vm.cpu, value: 0},
    {name: compute.vm.ram, value: 0},
    {name: compute.vm.storage.tier1, value:200},
    {name: compute.vm.storage.tier2, value: 1000}]
```

Responsive to such a service event, metering service 210 may further modify how usage of the virtual computing resources is recorded to reflect that CPU and RAM resources are no longer counted (i.e., having a 0 value). In the example shown, service 124 continues to meter usage of storage resources (i.e., values are not zeroed) since data in storage may continued to be persisted even when the VM is powered off, however it is recognized that such behavior may be dependent upon the metering behavior of each individual service 124.

Finally, metering service 150 may stop metering for a virtual computing resource in response to a service event indicating that a VM has been powered off, for example. In the example service event below, the event type field specifies a "termination" event in which the corresponding virtual computing resource has been completely de-allocated.

```
svc: { instid: org1, type: Compute, release: 1.0.0 },
eventtype: termination,
occurrence-timestamp: 20:15:01,
meters: [
    {name: compute.vm.cpu, value: 0},
    {name: compute.vm.ram, value: 0},
    {name: compute.vm.storage.tier1, value:0},
    {name: compute.vm.storage.tier2, value: 0}]
```

In one or more embodiments, usage aggregator 204 of metering service 150 is configured to normalize emitted service events into a uniform periodic (e.g., hourly) view of allocation data. Usage aggregator 204 aggregates raw usage information, as specified by service events 210, to be rolled up to be provided to rating and billing system 152. For example, although metering service 150 may collect usage metrics at 20-second intervals, metering service 150 may ultimately only push aggregated hourly data to rating and billing system 152 for billing purposes.

Usage aggregator 204 generates aggregated event data 212 for usage data of a given time period based on the received service events. According to one embodiment, usage aggregator 204 may generate aggregated event data 212 that incorporates service events received during that time period, but also from service events received from a prior time period that are "carried forward" to the current time period, as described in further detail below. An example of aggregated event 212 is shown below:

```
recid: 1-123,
svc: { instid: org1, type: Compute, release: 1.0.0 },
ts: 01:01:00, start: 00:00:00, end : 01:00:00,
usage: [
    {name: compute.vm.cpu, value: 4},
    {name: compute.vm.ram, value: 8},
    {name: compute.vm.storage.tier1, value: 200},
    {name: compute.vm.storage.tier2, value: 1000}]
```

As shown, aggregated event data 212 may have a similar format to service events 210, plus the addition of an aggregated flag indicating that the event is an aggregated record, and timestamp fields specifying the start and end time of the time period.

In one embodiment, usage aggregator 204 transmits aggregated event data 212 to rating and billing system 152, which determines a billing rate to be applied to the aggregated event data according to one or more business rules. Rating and billing system 152 returns the rate information to rate receiver 206.

Figure 3:
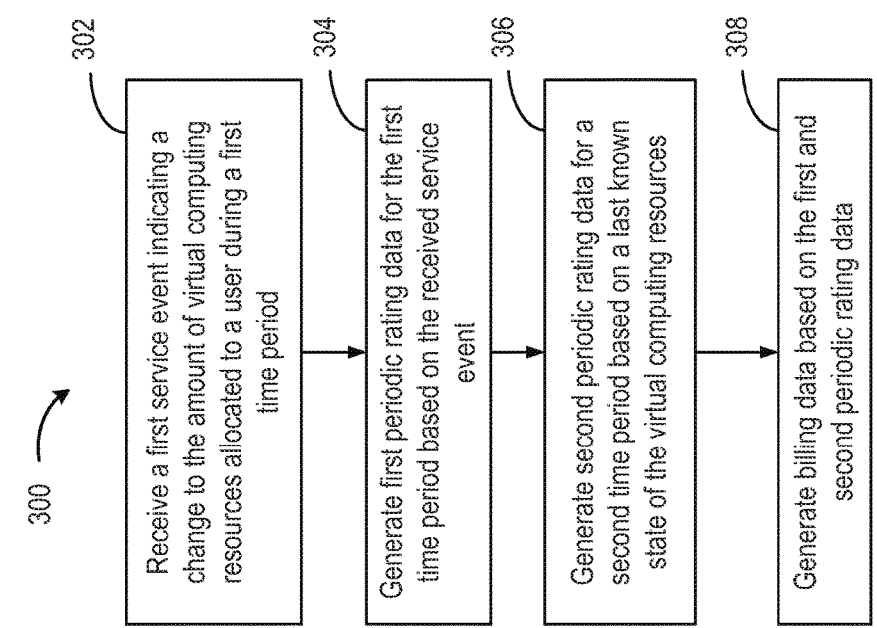
FIG. 3 is a flow diagram depicting a method 300 for generating rating and billing data for a cloud computing system, according to one embodiment of the present disclosure

FIG. 3 is a flow diagram depicting a method 300 for generating rating and billing data for a cloud computing system, according to one embodiment of the present disclosure. While method 300 is described in conjunction with components of the system shown in FIGS. 1 and 2, other components in computer systems 100 and 200 may perform the steps of method 300, as well as other systems may perform the described method.

Method 300 begins at step 302, where metering service 150 receives, from a cloud computing service, in particular a virtual computing resource service 124, a first service event 210 indicating a change to an amount of virtual computing resources allocated to a user by virtual computing resource service 124 during a first time period. In some cases, the change to an amount of virtual computing resources may be an initial allocation of one or more VMs having a particular amount of computing, memory, and storage resources. In other cases, the change to an amount of virtual computing resources may be an increase or decrease to the initial allocation. In yet other cases, the change to an amount of virtual compute resources may be a powering off or termination event representing a VM or other virtual computing resource is longer in use.

At step 304, metering service 150 generates first periodic rating data for the first time period based on the first received service event for a particular user. In some embodiments, the first periodic rating data may be aggregated service events 212. In some embodiments, metering service 150 calculates a total amount of each metered virtual computing resource that have been consumed by the user by adding each metered value from service events received in the first time period. For example, metering service 150 may calculate one sum total amount of CPU resources, another sum total amount of memory resources, and another sum total amount of storage resources used by a user, as specified by service events.

At step 306, metering service 150 generates second periodic rating data for a second time period (subsequent to the first time period) based on a last known state of the virtual computing resources. In one embodiment, in the absence of receiving another service event associated with a virtual computing resource, metering service 150 carries forward the last known state of the virtual computing resource from the previous time period. In some implementations, metering service 150 transforms the received first service event into a carried-forward service event associated with the second time period, as if the carried-forward service event had been received during the second time period. It is understood that the carried-forward service event may continue to be transformed into a next carried-forward service event for a next, subsequent time period, if appropriate (i.e., the state of the virtual computing resource did not change.)

Figure 4:
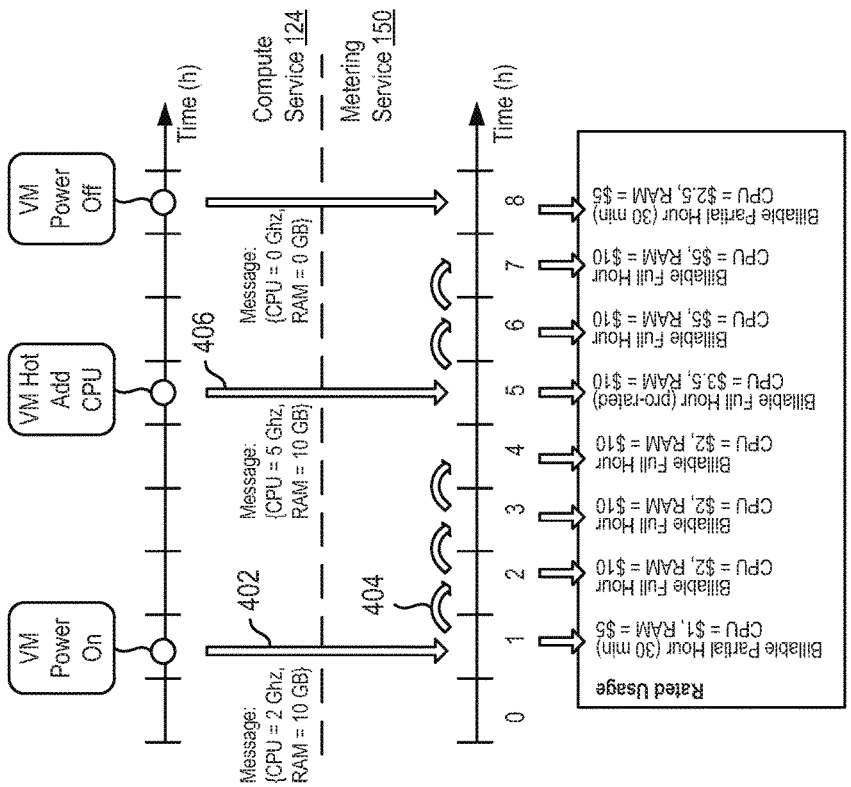
FIG. 4 is a timing diagram depicting an example provisioning operations of a virtual computing resource, according to embodiments.

An example of the carry-forward mechanism is depicted in FIG. 4. FIG. 4 is a timing diagram depicting an example provisioning operations of a virtual computing resource. FIG. 4 illustrates an example of metering and billing for a VM initially created with 2 GHz CPU and 10 GB of RAM, with a hot-add of 3 GHz of CPU after 4.5 hours of runtime, and then delete 7.5 hours from creation. For purposes of illustration, it may be assumed that rating and billing system 152 may include the following business rules (although other business rules may be used): CPU is priced at $1/GHz-h; RAM is priced at $1/GB-h; resources are pro-rated within the hour based on a time-weighted average; there is no minimum usage charge for any hour; cost is to be calculated on an hourly basis; and billing is on a monthly basis.

In the example shown, a virtual computer resource service powers on the VM at t=1, and transmits a service event 402 indicating that 2 GHz CPU and 10 GB memory resources have been allocated. Metering service 150 generates periodic rating data for t=1 based on service event 402, and determines that t=1 is a billable partial hour, incurring a $1 charge for the CPU and a $5 charge for the RAM.

For t=2, metering service 150 generates periodic rating data for t=2 based on the last known state of the powered-on VM. The state of the VM having 2 GHz CPU and 10 GB RAM is carried forward to t=2 (as depicted by arrow 404). Accordingly, metering service 150 and rating and billing system 152 coordinate to determine t=2 is a full billable hour costing $2 for the CPU resources and $10 for the RAM resources. Metering service 150 similarly generates periodic rating data for t=3 to t=4, by carrying forward the service event from t=2. As such, metering service 150 and rating and billing system 152 coordinate to determine t=3 and t=4 are each full billable hours costing $2 for the CPU resources and $10 for the RAM resources.

It may be noted that network traffic generated by the service 124 is limited to 3 messages for the life of the VM (and not 1 per hour or more as would be the case under traditional approaches.) That is, metering service 150 is able to generate periodic rating data for t=2 to t=4 without needing constant, additional, meter-reporting traffic from virtual computing service 124, as there would be using traditional approaches to metering, rating, and billing for a cloud computing service.

At t=5, in response to the user's request, virtual computing resource service 124 modifies the allocated VM by dynamically adding CPU resources to the VM (i.e., "VM Hot Add CPU"), and transmits a service event 406 indicating that 5 GHz CPU (and the existing 10 GB memory) has being allocated. Metering service 150 generates periodic rating data for t=5 based on service event 406, and further based on the carried forward service event from t=4. As a result, metering service 150 and rating and billing system 152 determine that t=5 is a full billable hour that has been pro-rated within t=5 on a time-weighted average, and determines the cost of t=5 is $3.5 for CPU resources and $10 for RAM resources.

At t=6 to t=7, metering service 150 generates periodic rating data based on the last known (updated) state of the VM, which is now known to be allocated a 5 GHz CPU and 10 GB RAM. As shown, metering service 150 determines t=6 and t=7 are full billable hours incurring costs of $5 and $10 for CPU and RAM, respectively.

At t=8, virtual computing resource service 124 powers off the VM, in response to user request, and transmits a service event (e.g., "CPU=0 GHz, RAM=0 GB"). Metering service 150 and rating system 152 determine that t=8 is a partial billable hour, and determine the costs to be $2.5 and $5 for CPU and RAM resources, respectively.

Referring back to the method 300 of FIG. 3, at step 308, metering service 150 may generate billing data based on the first and second periodic rating data. In the example of FIG. 4, metering service 150 totals all determined costs from t=1 to t=8 and generates a bill indicating total charge of $125 (i.e., $25 for CPU resources plus $80 for RAM) associated with allocation of virtual computing resources in cloud computing system 100 for the particular user.

Periodic Reconciliation of Service Events

As embodiments of the present disclosure provide a mechanism for generating periodic rating data based on (infrequently transmitted) service events, situations may arise in which a missed or duplicate transmission of a service event may cause significant problems in under-billing or over-billing a customer. For example, if a service event signaling that a VM has been powered on is missed, the usage of that VM may be under-reported, resulting in a loss to the cloud computing service provider. In another example, if a service event signaling that a VM has been powered off is missed, then the usage of that VM continues to generate billing data, resulting in over-billing of customers and customer dissatisfaction.

According to one or more embodiments of the present disclosure, metering service 150 and services 124 are configured to perform a reconciliation protocol which detects and resolves for any missed, dropped, or lost transmissions of service events. For a given time interval, if the number of service events emitted by a service 124 are equal to the number of service events received by metering service 150, then no reconciliation need be performed. However, in cases where service events received by metering service 150 is either more or less than the emitted events, than reconciliation is performed to account for missed or duplicate service events. In one embodiment, the reconciliation protocol may have two phases, a detection phase and a reconciliation phase.

FIG. 5 is a flow diagram depicting a method 500 for detecting missed service events in a cloud computing system, according to one embodiment of the present disclosure. While method 500 is described in conjunction with components of the system shown in FIGS. 1 and 2, other components in computer systems 100 and 200 may perform the steps of method 500, as well as other systems may perform the described method.

In one embodiment, metering service 150 may run a detection process for a given start time and an end time and may detect any service events that may have been lost in transit. For a given interval, metering service 150 performs a binary search to determine granular time intervals for missed service events. The binary search may return multiple time intervals depending on the number of missed service events. Termination criteria for the binary search may be: (1) for a given time interval, service events received by metering service 150 is equal to the number of emitted service events; (2) arrived time interval contains the missed service event and the time difference between the start and end time is less than a threshold time duration (e.g., 1 millisecond).

Method 500 begins at step 502, where metering service 150 transmits (e.g., via message bus 126) to a particular service 124 a reconcile-detect request indicating a start and end time. At step 504, metering service 150 receives a response (e.g., via message bus 126) from the particular service 124 indicating a count of service events transmitted by that service in the given time period from the specified start time to the specified end time.

At step 506, metering service 150 determines whether the count of transmitted service events is equal to a count of service events received by metering service 150. If equal, at step 508, the detection phase may end successfully for the given time period. If there is a mismatch between the count of transmitted service events and the count of received service events, and if the service event count is zero (step 510), at step 512, the procedure determines that the specified time period has a lost service event and returns the specified time period. Otherwise, if there is a count mismatch but the service event count is not zero, at step 514, metering service 150 divides the current time period into two new time periods and proceeds to perform steps 502 to 510 for each new time period. For example, given a specified time period from start time st0 to end time et0, metering service 150 divides the time period into a first portion (st0, (st0+et0)/2) and a second portion ((st0+et0)/2, et0), and iterates method 500 using each of the first and second portions.

In one embodiment, metering service 150 may run a reconciliation process in which the lost service events are retrieved from service. FIG. 6 is a flow diagram depicting a method 600 for modifying usage data in a cloud computing system based on a reconciliation process, according to one embodiment of the present disclosure. While method 600 is described in conjunction with components of the system shown in FIGS. 1 and 2, other components in computer systems 100 and 200 may perform the steps of method 600, as well as other systems may perform the described method.

Method 600 begins at step 602, for each time period identified as having missing service events from a particular virtual computing resource service 124 (e.g., as performed in step 512), metering service 150 requests from the particular service 124 a replay of service events during the identified time period. At step 604, metering service 150 receives, from one or more services 124, a replay of service events from the identified time period, i.e., from a specified start time to a specified end time, inclusive.

At step 606, metering service 150 modifies existing periodic rating data based on the reply of service events. Metering service 150 may modify existing periodic rating data from the identified time period itself, as well as relevant subsequent time periods, such as any time periods in which carried-forward events were used to generate the periodic rating data. For example, if a service event was lost in a first time period (t=1), and metering service 150 had already erroneously generated periodic rating data in a second time period (t=2) based on a carried-forward (but out-dated) service event from the previous first time period t=1, the periodic rating data in the second time period t=2 must now be updated to correctly represent usage of virtual computing resources during the first and second time periods.

When the Reconciliation task determines that the number of events considered for usage aggregation was incorrect (due to missed events), it causes the "Carryforward Based Missed Edge Detection" to apply the process outlined in that section to generate the correct/updated usage for the given time period.

It should be recognized that metering service 150 may perform the detection and reconciliation process with each of the plurality of services 124 within data center 104. It may be further noted that metering service 150 may perform the detection and reconciliation process on a periodic basis, for example, once every 24 hours, although other periodicities may be used.

Carryforward Based Missed Edge Detection

As discussed above, as a part of rating data aggregation, the last service event packet associated with an allocated computing resource in that hour is transformed and put as the first packet of the next hour. The transformed packet may be referred to as a carry-forward packet. For explanatory purposes, consider the transformation of packet P into a carry-forward packet P' defined by a function CF(P), such that P'=CF(P). Two functions, FP(h,L) and LP(h,L), which gives first service event packet for a virtual computing resource identified as L and for the given hour H. Given a packet P, let iSCF(P) be a Boolean function which gives if the packet is a carry-forward packet or an emitted packet. A reconciliation candidate may be denoted using tuple notation. (L,h) means the reconciliation needs to be run for the usage of the virtual computing resource L for hour h. Given the above functions, the reconciliation candidates can be selected based on the following conditions.

Condition 1. If the carry-forward has happened properly for hour h, then the following condition holds: FP(h+1,L1)=CF(LP(h,L)). For any hour h and an allocated virtual computing resource L, if the above condition does not hold, rating data for the resource L has to be reconciled for hour h.

Condition 2. If the carry-forward packet is the only packet of the hour h and if the carry-forward is propagated properly to the next hour, then reconciliation should be run for the current hour for the virtual computing resource L if (L,h−1) reconciliation candidate. IF (iSCF (LP(h))) AND IF (FP(h+1,L)=CF(LP(h,L))) THEN (L,h) is a reconciliation candidate if (L,h−1) is a reconciliation candidate.

Condition 3. If the (L,H) pair is not a reconciliation candidate based on the above two conditions and (L,H−1) is a reconciliation candidate as a result of either Condition 1 or Condition 2, then (L,H) is also a reconciliation candidate. Because, the new carry-forward that will be calculated by running aggregation for (L,H−1) will result in a change in aggregated usage for hour H. As such, The above three conditions can be used to find out reconciliation candidates.

Figure 7:
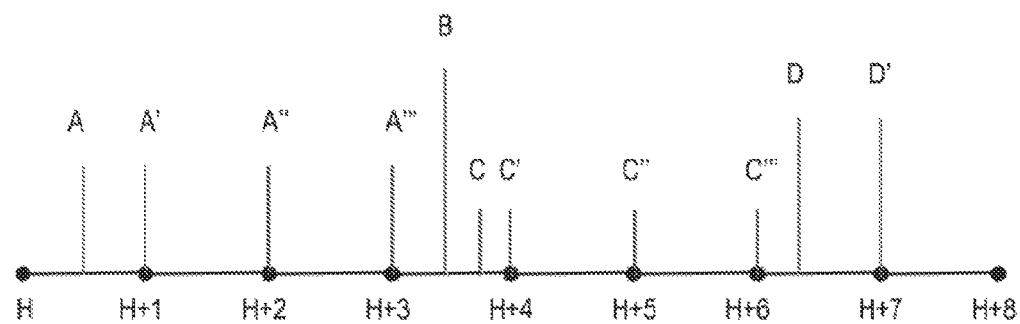
FIGS. 7-9 depict propagation of packets.

FIG. 7 depicts a propagation of carry-forwards on completion of aggregation for hours H to H+6. In FIG. 7, the service event packets A,B,C and D are the emitted packets collected by collectors. The other packets are propagated packets. The aggregation has run for hours H to H+6. The packet A' is the carry-forward generated while aggregating for hour H and A' becomes the first packet of hour H+1.

While aggregating for hour H+3, the last packet of the hour C gets carried forward as C'. Similarly while aggregating for hour H+4, the packet C' is carried forward as C'' on hour H+5 and so on. Consider:

A'=CF(A), A''=CF(A'), A'''=CF(A'') and so on
B'=CF(B), B''=CF(B'), B'''=CF(B'') and so on
C'=CF(C), C''=CF(C'), C'''=CF(C'') and so on
D'=CF(D), D''=CF(D'), D'''=CF(D'') and so on None of the above three conditions hold good for hours H to H+6 for the case depicted in FIG. 7. Such conditions therefore indicate that the propagation of carry-forward packets due to aggregation has been proper. So, none of packets are reconciliation candidates.

Figure 8:
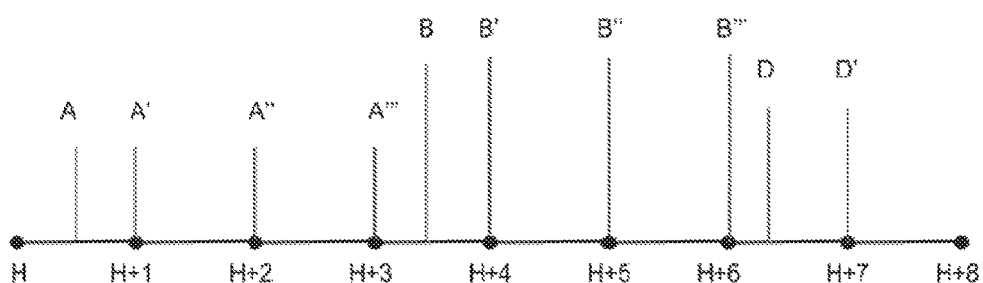

Similarly in case depicted in FIG. 8, the carry-forward packets due to aggregation is proper for hours H to H+6.

Figure 9:
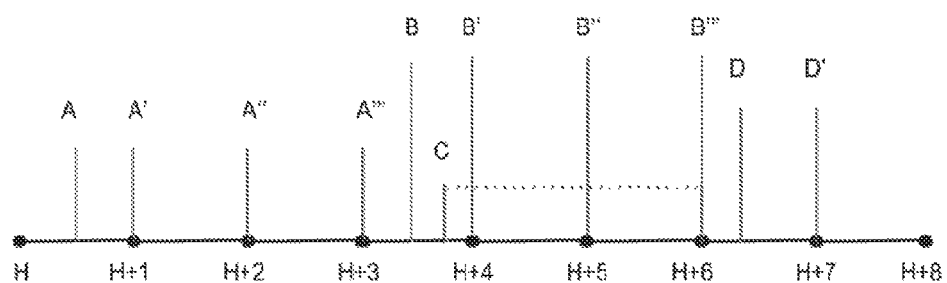

Meanwhile, a delayed packet C belonging to hour H+3 (as depicted in FIG. 9) is received after aggregation has run for hours H to H+6. According to Condition 1 and Condition 2, aggregation needs to be run for hour H+4 and H+5. Rating data for H+6 is also a reconciliation candidate as per Condition 3.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method, comprising:
   receiving, from a cloud computing service executing in a data center, a first service event indicating a change to an amount of virtual computing resources allocated to a user by the cloud computing service during a first time period;
   metering, by a metering service executing in the data center, the amount of virtual computing resources to generate first periodic rating data for the first time period based on the received first service event;
   generating, by the metering service, second periodic rating data for a second time period based on a last known state of the virtual computing resources according to the first service event, the second time period occurring after the first time period;
   determining at least one service event was not received during the first time period by determining which portions of the first time period that the at least one service event was not received by iteratively performing a binary search on shorter portions of the first time period;
   responsive to determining at least one service event was not received during the first time period, requesting, by the metering service, a replay of service events from cloud computing service during the first time period; and
   modifying, by the metering service, the first and second periodic rating data based on the replay of service events.

2. The method of claim 1, wherein determining at least one service event was not received during the first time period, further comprises:
   requesting from the cloud computing service a count of service events transmitted during a portion of the first time period; and
   determining that the count of service events transmitted is not equal to an actual count of service events received during the portion of the first time period.

3. The method of claim 1, wherein the last known state of the virtual computing resources represented by the first service event is carried forward into the second time period.

4. The method of claim 1, wherein a metering service that receives the first service event from the cloud computing service is located geographically proximate to a virtual cloud computing system executing the cloud computing service.

5. A non-transitory computer-readable storage medium comprising instructions that, when executed in a computing device, manage a cloud computing system, by performing the steps of:
   receiving, from a cloud computing service executing in a data center, a first service event indicating a change to an amount of virtual computing resources allocated to a user by the cloud computing service during a first time period;
   metering, by a metering service executing in the data center, the amount of virtual computing resources to generate first periodic rating data for the first time period based on the received first service event;
   generating, by the metering service, second periodic rating data for a second time period based on a last known state of the virtual computing resources according to the first service event, the second time period occurring after the first time period;
   determining at least one service event was not received during the first time period by determining which portions of the first time period that the at least one service event was not received by iteratively performing a binary search on shorter portions of the first time period;
   responsive to determining at least one service event was not received during the first time period, requesting, by the metering service, a replay of service events from cloud computing service during the first time period; and modifying, by the metering service, the first and second periodic rating data based on the replay of service events.

6. The non-transitory computer-readable storage medium of claim 5, wherein the step of determining at least one service event was not received during the first time period, further comprises:
   requesting from the cloud computing service a count of service events transmitted during a portion of the first time period; and
   determining that the count of service events transmitted is not equal to an actual count of service events received during the portion of the first time period.

7. The non-transitory computer-readable storage medium of claim 5, wherein the last known state of the virtual computing resources represented by the first service event is carried forward into the second time period.

8. The non-transitory computer-readable storage medium of claim 5, wherein a metering service that receives the first service event from the cloud computing service is located geographically proximate to a virtual cloud computing system executing the cloud computing service.

9. A cloud computing system, comprising:
   a plurality of host computers, each of which is configured to execute one or more virtual machines (VMs) therein; and
   a metering server configured to track virtual computing resources of the cloud computing system, wherein the metering server is programmed to:
      receive, from a cloud computing service executing in a data center, a first service event indicating a change to an amount of the virtual computing resources allocated to a user by the cloud computing service during a first time period;
      meter the amount of virtual computing resources to generate first periodic rating data for the first time period based on the received first service event;
      generate second periodic rating data for a second time period based on a last known state of the virtual computing resources according to the first service event, the second time period occurring after the first time period;
      determine at least one service event was not received during the first time period by determining which portions of the first time period that the at least one service event was not received by iteratively performing a binary search on shorter portions of the first time period;
      responsive to determining at least one service event was not received during the first time period, request a replay of service events from cloud computing service during the first time period; and
      modify the first and second periodic rating data based on the replay of service events.

10. The cloud computing system of claim 9, wherein the metering server configured to determine that at least one service event was not received during the first time period is further configured to:
   request from the cloud computing service a count of service events transmitted during a portion of the first time period; and
   determine that the count of service events transmitted is not equal to an actual count of service events received during the portion of the first time period.

11. The cloud computing system of claim 9, wherein the last known state of the virtual computing resources represented by the first service event is carried forward into the second time period.

12. The cloud computing system of claim 9, wherein the metering server is located geographically proximate to the virtual cloud computing system executing the cloud computing service.

* * * * *